(12) United States Patent
Wu et al.

(10) Patent No.: US 6,825,940 B1
(45) Date of Patent: *Nov. 30, 2004

(54) METHOD OF PROCESSING DOCUMENTS IN AN IMAGE-BASED DOCUMENT PROCESSING SYSTEM AND AN APPARATUS THEREFOR

(75) Inventors: Hui Wu, Waterloo (CA); Stewart B. Kelland, Waterloo (CA); Neil P. Boyd, Waterloo (CA)

(73) Assignee: NCR Corporation, Dayton, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1077 days.

(21) Appl. No.: 09/108,716

(22) Filed: Jul. 1, 1998

(51) Int. Cl.$^7$ ................................................ G06F 15/00
(52) U.S. Cl. ...................... 358/1.15; 358/452; 382/138; 382/181; 382/190; 382/219
(58) Field of Search ................................ 358/1.15, 452; 382/137, 138, 139, 181, 190, 209, 186, 187, 218, 219, 175, 192; 235/379, 431, 437

(56) References Cited

U.S. PATENT DOCUMENTS

| | | |
|---|---|---|
| 5,134,564 A | 7/1992 | Dunn et al. |
| 5,146,512 A * | 9/1992 | Weideman et al. ......... 382/138 |
| 5,151,948 A | 9/1992 | Lyke et al. |
| 5,225,978 A | 7/1993 | Petersen et al. .............. 705/33 |
| 5,530,773 A * | 6/1996 | Thompson .................. 382/138 |

FOREIGN PATENT DOCUMENTS

| | | |
|---|---|---|
| EP | 0446634 | 9/1991 |
| FR | 2716987 | 9/1995 |

* cited by examiner

Primary Examiner—Mark Wallerson
(74) Attorney, Agent, or Firm—Michael Chan

(57) ABSTRACT

A method of processing documents in an image-based document processing system to associate recognition results from a primary source results list with corresponding recognition results from a secondary source results list to improve assistance to an operator of the image-based document processing system during, operation of the image-based document processing system comprises the steps of (a) scanning a first type of document to obtain scanned data representative thereof, (b) scanning a second type of document to obtain scanned data representative thereof, (c) processing scanned data representative of the first type of document to provide recognition results associated with the first type of document, (d) processing scanned data representative of the second type of document to provide recognition results associated with the second document, (e) storing recognition results associated with the first type of document in a primary list, (f) storing recognition results associated with the second type of document in a secondary list, (g) comparing recognition results from the primary list with recognition results from the secondary list to determine if an exact match occurs and thereby to associate a first set of recognition results from the primary list and a first set of recognition results from the secondary list, and (h) comparing recognition results from the primary list with recognition results from the secondary list to determine if an approximate match occurs when an exact match fails to occur in step (g) and thereby to associate a second set of recognition results from the primary list and a second set of recognition results from the secondary list.

20 Claims, 11 Drawing Sheets

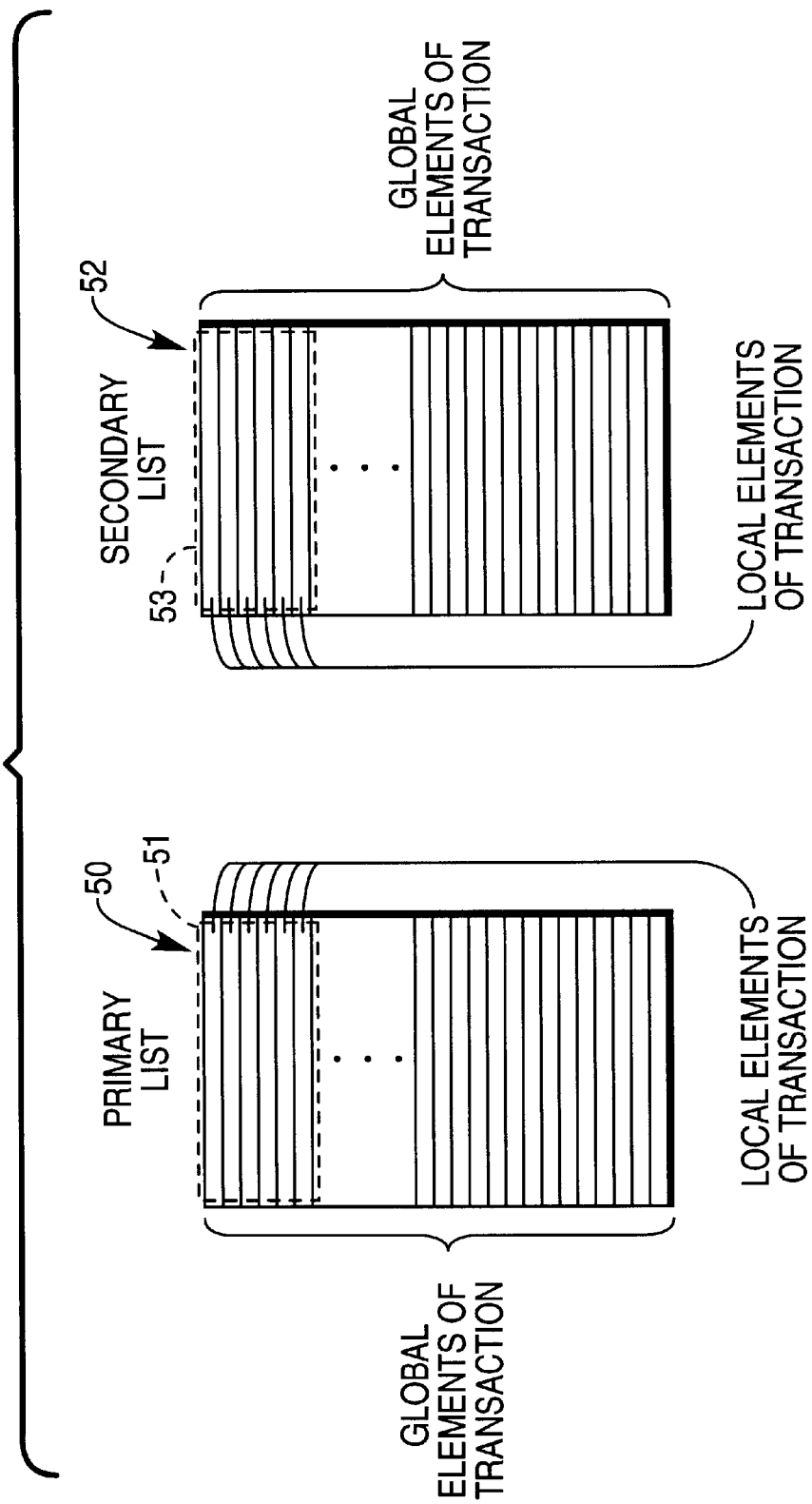

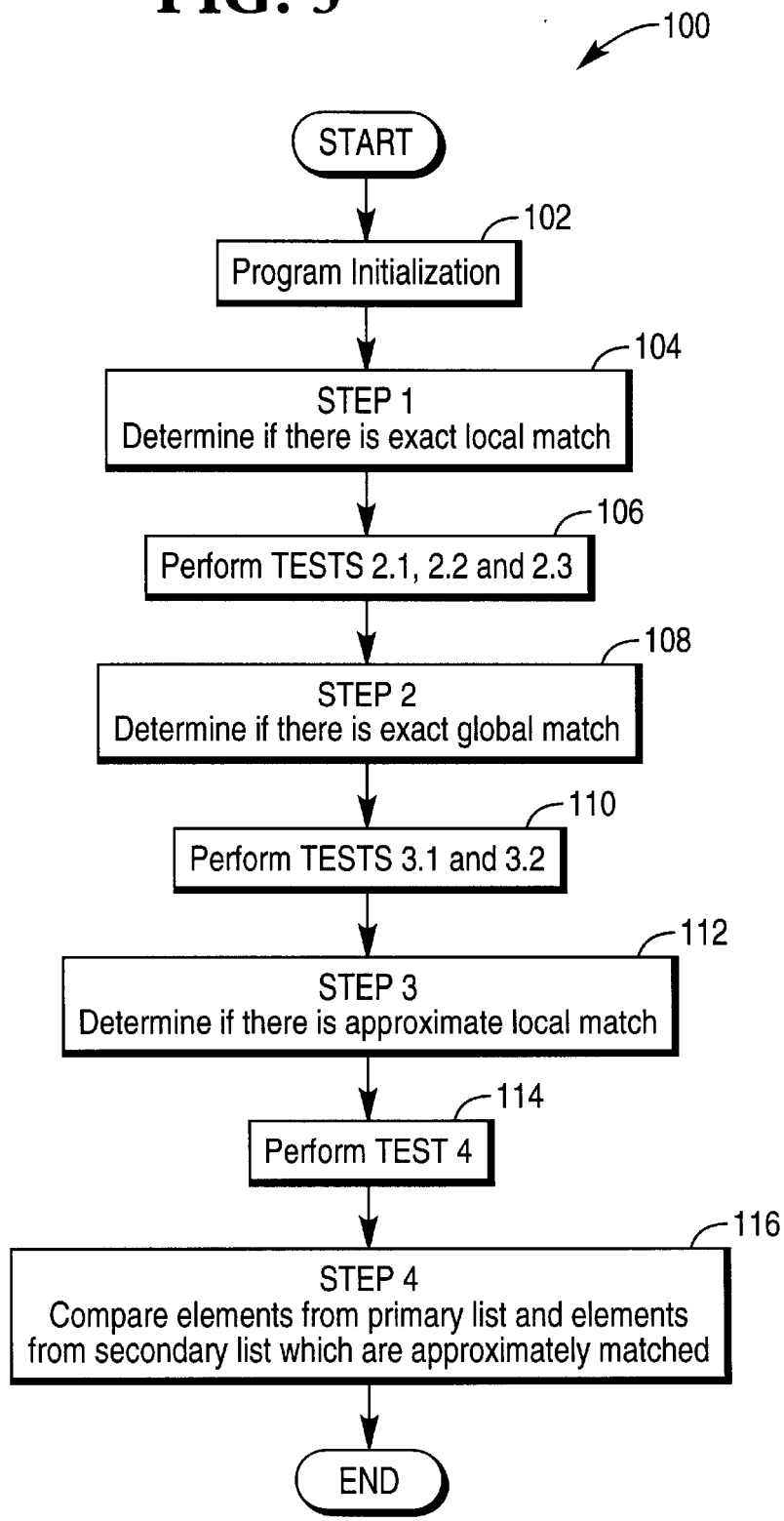

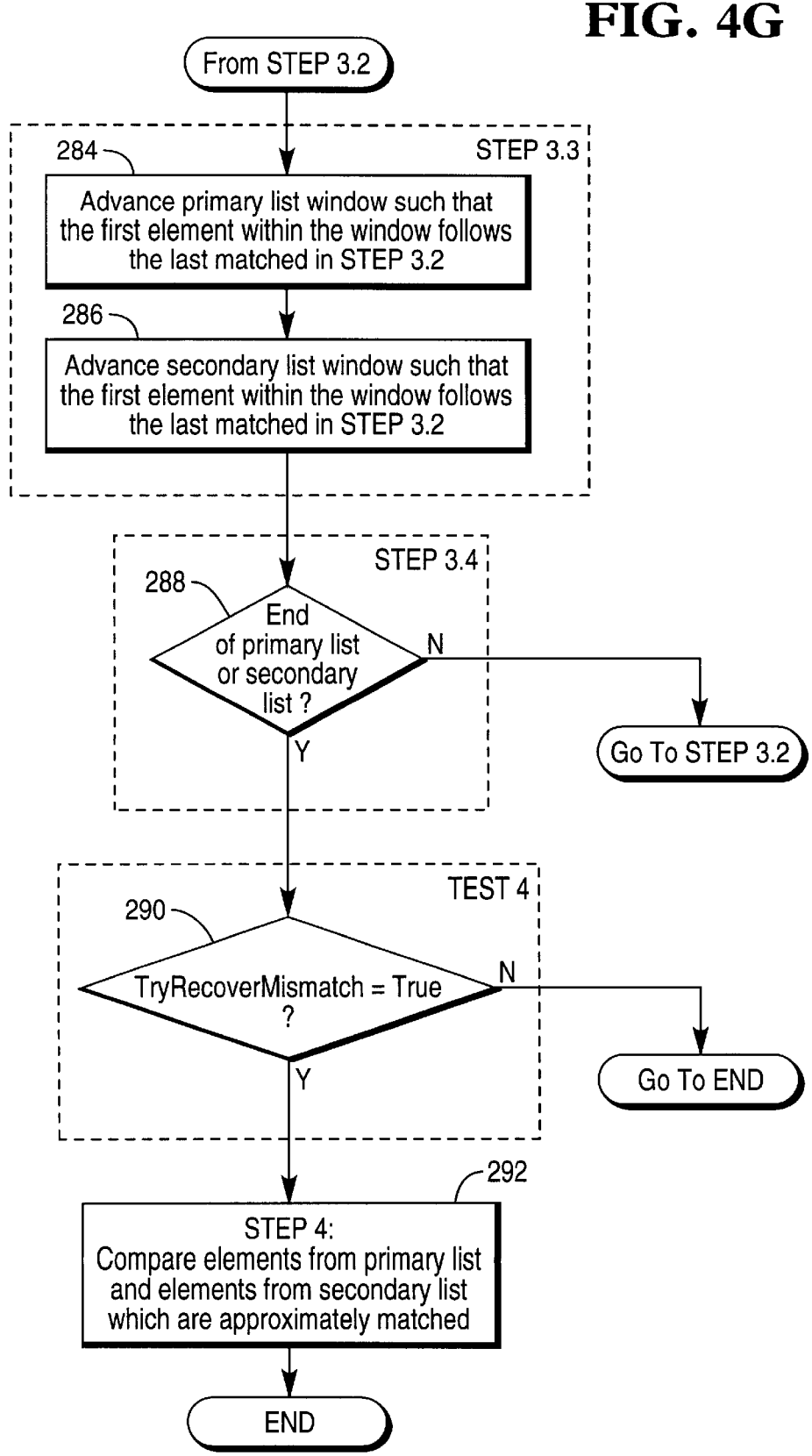

FIG. 5

CHARACTER CONFUSION RELIABILITY TABLE

|  |  | \multicolumn{10}{c}{PRIMARY CHARACTER} |
| --- | --- | --- | --- | --- | --- | --- | --- | --- | --- | --- | --- |

| | | 0 | 1 | 2 | 3 | 4 | 5 | 6 | 7 | 8 | 9 |
|---|---|---|---|---|---|---|---|---|---|---|---|
| SECONDARY CHARACTER | 0 | 10 | 3 | 1 | 1 | 5 | 3 | 7 | 1 | 6 | 5 |
| | 1 | 3 | 10 | 5 | 1 | 3 | 1 | 3 | 7 | 3 | 5 |
| | 2 | 1 | 5 | 10 | 7 | 3 | 5 | 1 | 7 | 1 | 3 |
| | 3 | 1 | 1 | 7 | 10 | 3 | 5 | 1 | 3 | 7 | 5 |
| | 4 | 5 | 3 | 3 | 3 | 10 | 1 | 1 | 5 | 1 | 7 |
| | 5 | 3 | 1 | 5 | 5 | 1 | 10 | 6 | 1 | 3 | 5 |
| | 6 | 7 | 3 | 1 | 1 | 1 | 6 | 10 | 1 | 5 | 3 |
| | 7 | 1 | 7 | 7 | 3 | 5 | 1 | 1 | 10 | 1 | 5 |
| | 8 | 6 | 3 | 1 | 7 | 1 | 3 | 5 | 1 | 10 | 6 |
| | 9 | 5 | 5 | 3 | 5 | 7 | 5 | 3 | 5 | 6 | 10 |

METHOD OF PROCESSING DOCUMENTS IN AN IMAGE-BASED DOCUMENT PROCESSING SYSTEM AND AN APPARATUS THEREFOR

BACKGROUND OF THE INVENTION

The present invention relates to image-based document processing systems, and is particularly directed to processing documents in an image-based document processing system, such as an image-based check processing system, to associate recognition results to improve assistance to an operator of the image-based document processing system.

A typical image-based check processing system includes a number of different types of workstations. The different types of workstations may include a document preparation workstation, an image capture workstation, a recognition workstation, a keying and balancing workstation, an encoding workstation, and a printing workstation. An image capture workstation creates units of work and submits the created work to a workflow manager in a known way. Workstations downstream from the image capture workstation poll the workflow manager in a known manner for work to perform, and may also create units of work which are submitted back to the workflow manager. Image data and codeline data are processed at the different workstations.

During typical operation of known image-based check processing systems, an image capture workstation captures images of bank documents such as checks and deposit slips being processed and sends these images to a recognition workstation which recognizes the amount of each bank document. When adding machine tapes are present, the image capture workstation also captures images of the adding machine tapes and sends these images to the recognition workstation which also recognizes the amount of each adding machine tape. Accordingly, the recognition workstation provides recognition results associated with the bank documents and recognition results associated with the adding machine tapes.

The bank documents are grouped into transactions. A single transaction consists of credits and debits. One or more transactions are grouped together into a batch. Within a single transaction, the sum of credit amounts and the sum of debit amounts must balance. To balance each transaction, an operator manually keys in certain amounts. The certain amounts keyed in are based upon images provided by the image capture workstation.

Recognition results from adding machine tapes or deposit slip listings are sometimes used to enhance system performance. To enhance system performance, it is necessary to associate each amount read from an adding machine tape or a deposit slip listing with a corresponding amount read from a bank document. In some known check processing systems, an operator manually associates amounts read from bank documents with amounts read from adding machine tapes or deposit slip listings. In some other known check processing systems, a processor associates amounts read from bank documents with amounts read from adding machine tapes or deposit slip listings without operator intervention.

SUMMARY OF THE INVENTION

In accordance with one aspect of the present invention, a method of processing documents in an image-based document processing system to associate recognition results from a primary source results list with corresponding recognition results from a secondary source results list to improve assistance to an operator of the image-based document processing system during operation of the image-based document processing system comprises the steps of (a) scanning a first type of document to obtain scanned data representative thereof, (b) scanning a second type of document to obtain scanned data representative thereof, (c) processing scanned data representative of the first type of document to provide recognition results associated with the first type of document, (d) processing scanned data representative of the second type of document to provide recognition results associated with the second document, (e) storing recognition results associated with the first type of document in a primary list, (f) storing recognition results associated with the second type of document in a secondary list, (g) comparing recognition results from the primary list with recognition results from the secondary list to determine if an exact match occurs and thereby to associate a first set of recognition results from the primary list and a first set of recognition results from the secondary list, and (h) comparing recognition results from the primary list with recognition results from the secondary list to determine if an approximate match occurs when an exact match fails to occur in step (g) and thereby to associate a second set of recognition results from the primary list and a second set of recognition results from the secondary list.

Preferably, step (g) includes the steps of (g-1) comparing recognition results from the primary list with recognition results from the secondary list to determine if an exact local match occurs, and (g-2) comparing recognition results from the primary list with recognition results from the secondary list to determine if an exact global match occurs. Step (h) includes the step of (h-1) comparing recognition results from the primary source results list of step (e) with recognition results from the secondary list to determine if an approximate local match occurs.

In accordance with another aspect of the present invention, an apparatus is provided for processing documents in an image-based document processing system to associate recognition results from a primary source results list with corresponding recognition results from a secondary source results list to improve assistance to an operator of the image-based document processing system during operation of the image-based document processing system. The apparatus comprises means for scanning a first and second types of documents to obtain scanned data representative thereof. Means is provided for processing scanned data representative of the first and second types of documents to provide recognition results associated therewith. Means is provided for storing recognition results associated with the first type of document in a primary list and recognition results associated with the second type of document in a secondary list. Means is provided for (i) comparing recognition results from the primary list with recognition results from the secondary list to determine if an exact match occurs and thereby to associate a first set of recognition results from the primary list and a first set of recognition results from the secondary list, and (ii) comparing recognition results from the primary list with recognition results from the secondary list to determine if an approximate match occurs when an exact match fails to occur and thereby to associate a second set of recognition results from the primary list and a second set of recognition results from the secondary list.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 2 is a diagrammatic illustration of primary and secondary lists containing transaction items;

FIGS. 3 and 4A-4G are flowcharts depicting steps carried out by the image-based check processing system of FIG. 1 to process transaction items of FIG. 2 in accordance with the present invention; and FIG. 5 is a character confusion reliability table which can be used in certain approximation matching steps in the flowcharts of FIGS. 3 and 4A-4G.

DETAILS OF THE INVENTION

Figure 1:
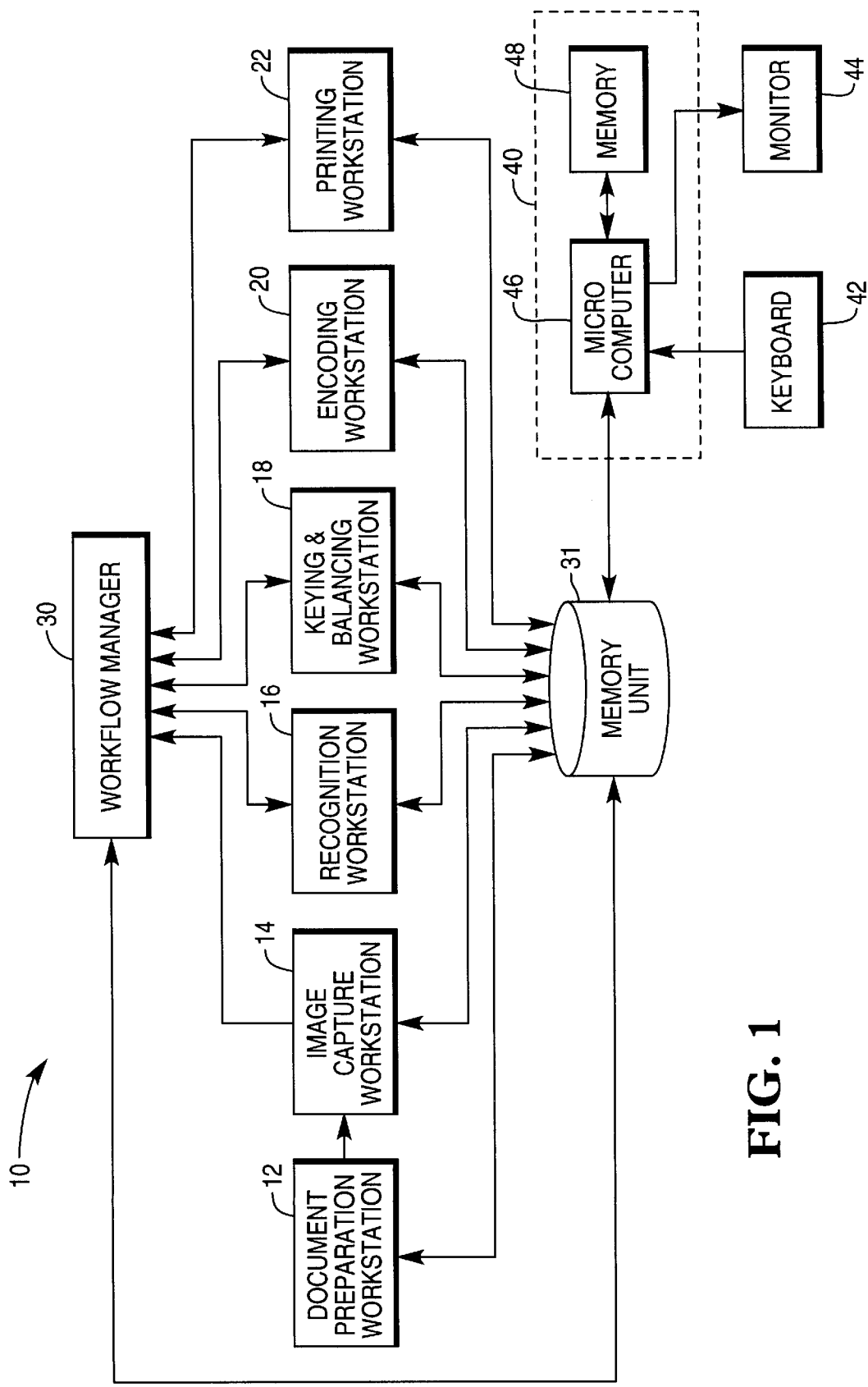
FIG. 1 is a schematic block representation of an image-based check processing system embodying the present invention.

The present invention is directed to processing documents in an image-based document processing system to associate recognition results from a primary source results list with corresponding recognition results from a secondary source results list to improve assistance to an operator of the image-based document processing system during operation of the image-based document. The specific use of the method described in the present application may vary. By way of example, an image-based document processing system in the form of an image-based check processing system 10 embodying the present invention is illustrated in FIG. 1.

The image-based check processing system 10 comprises different types of workstations including a document preparation workstation 12, an image capture workstation 14, a recognition workstation 16, a keying and balancing workstation 18, an encoding workstation 20, and a printing workstation 22. The image capture workstation 14 creates units of work and submits the created work to a workflow manager 30 in a known way. Each of the workstations 16, 18, 20, 22 polls the workflow manager 30 in a known manner for work to perform, and may also create units of work which is submitted back to the workflow manager 30.

At the document preparation workstation 12, transaction items including a number of debit items and a number of credit items associated with each transaction are prepared for further processing. Typical transaction items include checks, deposit slips, and adding machine tapes. Checks, deposit slips, and certain other transaction items are classified as proof items. Adding machine tapes are classified as non-proof items. Preparation of the transaction items may include removal of paper clips, staples, and the like, and stacking of the items in a particular order and/or direction in suitable trays. The trays containing the stacked items are then manually carted to the image capture workstation 14.

At the image capture workstation 14, the stacked items in the trays are manually removed from the trays and placed onto an image lift transport (not shown) of the image capture workstation 14. If the items being processed is an adding machine tape, then a tape scanner (not shown) of known design and construction captures an electronic image of the adding machine tape and stores the image in a memory unit 31. If the item being processed is a proof item such as a deposit slip, then the deposit slip is moved along a transport track of the image lift transport in front of a front image lift camera and in front of a rear image lift camera (both not shown). The image lift camera optically scans each proof item as the proof item moves along the transport track in front of the cameras to produce front and rear electronic images of the proof item. These images are also stored in the memory unit 31. Other proof items (transaction balancing slips, for example) are processed in the same manner.

If the item which is being processed is a proof item such as a check, then electronic images of the check are stored in a memory unit 31 along with a unique sequence number. If the check being processed contains a MICR codeline, the MICR codeline is read as the check passes by a MICR reader (not shown). Alternatively, if the check being processed contains an OCR codeline, the OCR codeline is read as the check passes by an OCR reader. For simplicity, it is assumed that the check being processed contains a MICR codeline. The MICR codeline is associated with the front and rear electronic images and is also stored in the memory unit 31. Suitable endorsement is printed onto the check as the check passes an endorser module (not shown). An endorsement status associated with the check is then stored in the memory unit 31 along with the other information associated with the check. Also, the check is microfilmed as the check passes a microfilmer (not shown). A microfilm status associated with the check is stored in the memory unit 31.

After the images of a check are lifted by the image lift cameras and the electronic images, the sequence number, and the MICR codeline are captured, and the check is endorsed and microfilmed, the check is sorted into an appropriate sorter pocket (not shown) of the image capture workstation 14. Preferably, the image capture workstation 14 includes the Model 7780 Item Processing System, manufactured by NCR Corporation, located in Dayton, Ohio. The sorted checks in each of the sorter pockets are stacked in a respective tray. The trays are then manually carted to the encoder workstation 20. The trays of checks are encoded in a known manner at the encoder workstation 20 while the electronic images, the sequence numbers, and the MICR codelines of the checks which were earlier captured and stored in the first memory unit 31 at the image capture workstation 14 are processed by the recognition workstation 16 and the keying and balancing workstation 18 in the manner described hereinbelow. An encoder status associated with the check is stored in the first memory unit 31.

At the recognition workstation 16, the electronic images of the checks stored in the memory unit 31 after being processed at the image capture workstation 14 are processed using known recognition techniques to determine the "amount" associated with each check. The amount of each check is then associated with the corresponding electronic images and the MICR codeline of the check and stored in the memory unit 31. A one-to-one correspondence is thereby established between the electronic images, the sequence number, the MICR codeline, the endorsement status, the encoder status, and the microfilm status of each check and the amount associated with that particular check. Accordingly, a database containing electronic images, the sequence number, the MICR codeline, the endorsement status, the encoder status, the microfilm status, and the amount associated with each check is thereby created and stored in the memory unit 31.

It should be noted that some amounts will not be recognizable to the recognition workstation 16. Also, some amounts may be recognized incorrectly at the recognition workstation 16.

A processor unit 40 associated with the image capture workstation 14 receives input signals from a keyboard 42 and provides output signals to the display screen of a monitor 44 in response to the input signals. The processor unit 40 includes a microcomputer 46 and a memory 48 which communicates with the microcomputer 46. The microcomputer 46 receives input signals from the keyboard 42 and processes these input signals in accordance with a program stored in the memory 48. Suitable microcomputers and memories are readily available in the marketplace. Their structure and operation are well known and, therefore, will not be described.

The microcomputer 46 communicates with the memory unit 31. As previously described, the memory unit 31 is a data and image memory which stores image data associated with adding machine tapes, deposit slips, and checks. Amounts associated with checks and deposit slip totals which have been processed through the recognition workstation 16 are stored in the memory 31. The amounts data stored in the memory unit 31 is referred to herein as "primary source results list" or simply "primary list" which is designated with reference numeral "50" shown in FIG. 2. The primary list 50 contains distinct elements which correspond to debit or credit amounts obtained from bank documents such as checks and deposit slips. More specifically, each element of the primary list 50 corresponds one-to-one with a single debit or credit amount associated with a bank document.

Amounts associated with adding machine tapes or deposit slip listings which have been processed through the recognition workstation 16 are stored in the memory unit 31. The amounts data stored in the memory unit 31 is referred to herein as "secondary source results list" or simply "secondary list" which is designated with reference numeral "52" shown in FIG. 2. The secondary list 52 contains distinct elements which correspond to amounts obtained from deposit slip listings and adding machine tapes. More specifically, each element of the secondary list 52 corresponds one-to-one with a single amount associated with either a deposit slip listing or an adding machine tape.

Elements of the primary list and elements of the secondary list are associated in accordance with the present invention to improve assistance to an operator of the image-based check processing system 10 during operation of the image-based check processing system. More specifically, after the recognition workstation 16 provides recognition results for a batch of transaction items including check(s), deposit slip(s) and/or adding machine tape(s), a program of associating transaction items in accordance with the present invention is initiated. FIG. 2 is a diagrammatic illustration of local and global elements contained in each of the primary and secondary lists for a single transaction. FIGS. 3 and 4 are flowcharts which depict steps of the transaction item associating program which is initiated immediately after the recognition workstation 16 provides all of the recognition results for the batch of transaction items. The steps of the transaction item associating program are depicted in FIGS. 3 and 4 and are described in detail hereinbelow with reference to elements contained in the primary and secondary lists illustrated in FIG. 2.

Referring to FIG. 2, the primary list 50 and the secondary list 52 are derived from a single transaction. All of the elements contained in a window over the primary list are "local" to the primary list of that particular transaction. All of the elements contained in the primary list are "global" to the primary list of that particular transaction. Similarly, all of the elements contained in a window over the secondary list are "local" to the secondary list of that particular transaction. All of the elements contained in the secondary list are "global" to the secondary list of that particular transaction.

As shown in FIG. 2, a window 51 of a predetermined size is movable on the primary list 50 to frame a predetermined number of elements within the window 51 for consideration thereof. Similarly, a window 53 of a predetermined size is movable on the secondary list 52 to frame a predetermined number of elements within the window 53 for consideration thereof. Preferably, the window 51 and the window 53 are of the same predetermined size. Each of the windows 51,53 shown in FIG. 2 has a size which frames six elements from its respective list. The use of a window to frame and thereby to select particular elements for further consideration thereof is well known and, therefore, will not be described. Although the windows 51,53 described have a size which frames six elements, it is conceivable that the windows 51,53 may have a size which frames a number other than six elements.

Referring to FIG. 3, a flowchart 100 provides an overview of steps in a transaction item associating program in accordance with the present invention. During program initialization in step 102, a number of parameters are defined and set to initial settings. The size of the windows 51,53 is defined to frame six elements, a first parameter "StandardMatchPercentage" is set to 60%, a second parameter "HighMatchPercentage" is set to 80%, a third parameter "SecondaryReverse" is set to "false", a fourth parameter "OutOfOrder" is set to "false", a fifth parameter "TryGlobalMatch" is set to "true", and a sixth parameter "TryRecoverMismatch" is set to "true". It is contemplated that the percentage values for each of the first and second parameters may be other than 60% and 80%, respectively. For simplicity, the third, fourth, fifth, and sixth parameters may be referred to hereinafter as FLAG "A", FLAG "B", FLAG "C", AND FLAG "D", respectively.

After program initialization in step 102, a determination is made in step 104 as to whether there is an exact local match between an element in the primary list and an element in the secondary list. The determination in step 104 is designated "STEP 1" and includes STEPS 1.1, 1.2, and 1.3 which are shown in detail in FIGS. 4A and 4B and which will be described in detail later. The program then proceeds to step 106 in which certain tests are performed. These tests include TESTS 2.1, 2.2, and 2.3 which are shown in detail in FIGS. 4B and 4C and which also will be described in detail later.

The program then proceeds to step 108 in which a determination is made as to whether there is an exact global match between an element in the primary list and an element in the secondary list. The determination in step 108 is designated "STEP 2" and includes STEPS 2.1, and 2.2 which are shown in detail in FIG. 4D and which will be described in detail later. The program proceeds to step 110 in which again certain tests are performed. These tests include TESTS 3.1 and 3.2 which are shown in detail in FIG. 4E and which also will be described in detail later.

The program then proceeds to step 112 in which a determination is made as to whether there is an approximate local match between an element in the primary list and an element in the secondary list. The determination in step 112 is designated "STEP 3" and includes STEPS 3.1, 3.2, 3.3, and 3.4 which are shown in detail in FIGS. 4F and 4G and which will be described in detail later. The program then proceeds to step 114 in which a certain test is performed. This test includes TEST 4 which is shown in detail in FIG. 4G and which also will be described in detail later. Then, in step 116, elements from the primary list and elements from the secondary list which are approximately matched as determined in step 112 are compared to determine if any of the elements may match or "better" approximate match. Step 116 is designated "STEP 4" which will be described in detail later.

Referring to FIGS. 4A-4G, the flowchart 100 of FIG. 3 is shown in greater detail. In particular, FIGS. 4A-4G provide details of the STEPS and TESTS just mentioned hereinabove in describing the overview flowchart of FIG. 3. The steps in the detailed flowchart of FIGS. 4A-4G are described hereinbelow with particular reference to elements contained in the primary and secondary lists 50, 52 shown in FIG. 2.

Figure 4A:
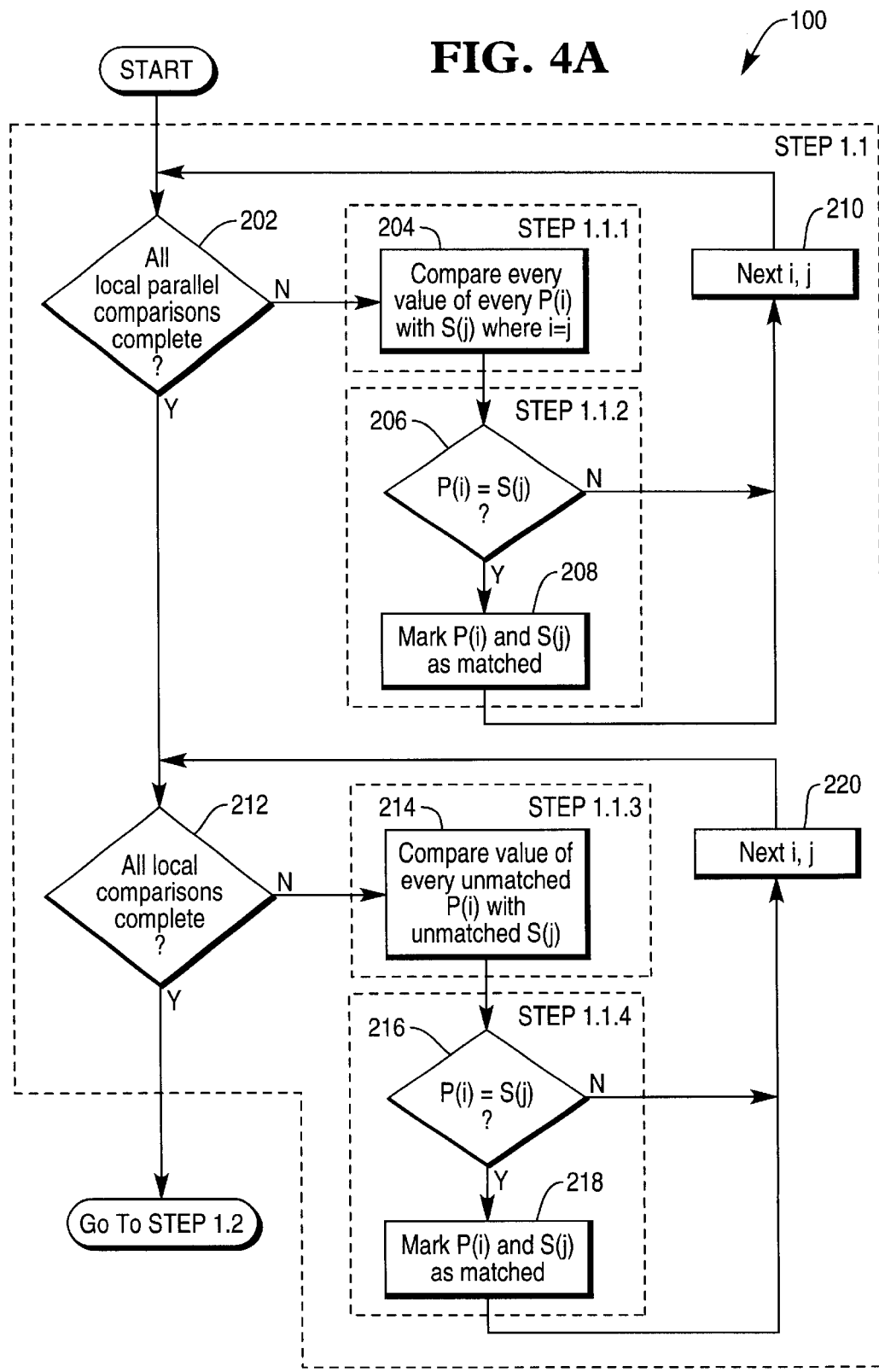
Figure 4B:
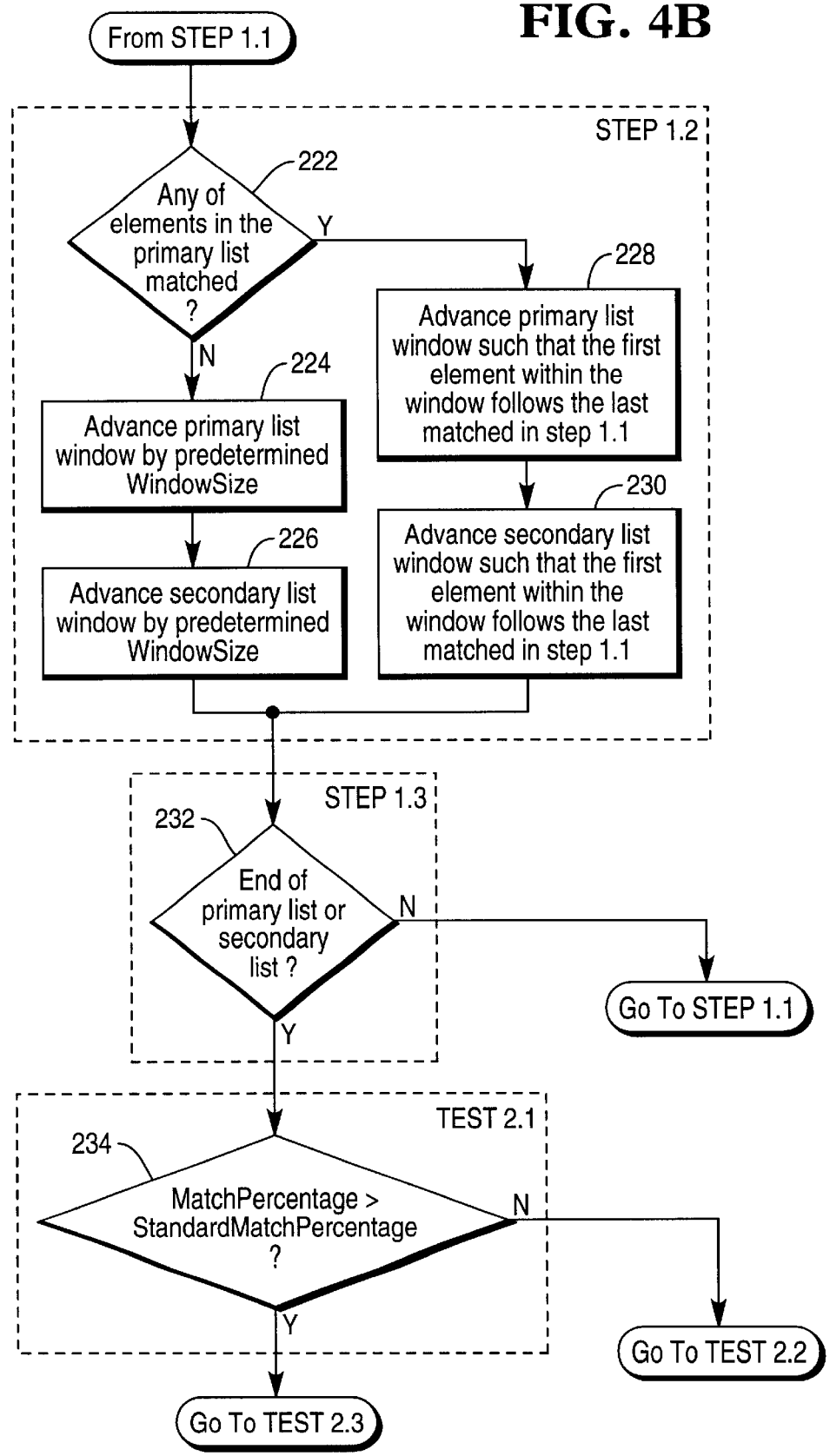

In step 202 of FIG. 4A, a determination is made as to whether all local parallel comparisons of parallel elements within the windows of the primary and secondary lists have been made. If the determination in step 202 is negative, the program proceeds to steps 204 and 206 in which the value of an element in the primary list (designated as "P(i)") is compared with the value of the corresponding element in the secondary list (designated as "S(j)"). If the determination in step 206 is negative, then the program loops back to step 202 through step 210 in which the next element in the primary list and the next corresponding parallel element in the secondary list are compared. If the determination in step 206 is affirmative, the program proceeds to step 208 in which this element in the primary list and this corresponding element in the secondary list are both marked as being matched to each other.

However, if the determination in step 202 is affirmative, the program proceeds to step 212 in which a determination is made as to whether all comparisons of elements within the windows of the primary list and elements of the secondary list have been made. If the determination is step 212 is negative, the program proceeds to steps 214 and 216 in which the value of an unmatched element in the primary list is compared with the value of an unmatched element in the secondary list. If the determination is step 216 is negative, then the program loops back to step 212 through step 220 in which the next unmatched element in the primary list and the next unmatched element in the secondary list are compared. If the determination in step 216 is affirmative, the program proceeds to step 218 in which the unmatched element in the primary list and the unmatched element in the secondary list are both marked as being matched to each other.

If the determination in step 212 is affirmative, then the program proceeds to step 222 in which a determination is made as to whether any element in the primary list matches an element in the secondary list within the current windows. If the determination in step 222 is negative, the program proceeds to steps 224 and 226 in which the window 51 over the primary list is advanced by a predetermined window size and the window 53 over the secondary list is also advanced by the same predetermined window size before proceeding to step 232. However, if the determination in step 222 is affirmative, the program proceeds to steps 228 and 230 in which the window 51 over the primary list is advanced such that the first element within the window 51 follows the last matched element in the previous window on the primary list and the window 53 over the secondary list is also advanced such that the first element within the window 53 follows the last matched element in the previous window on the secondary list before proceeding to step 232.

Then, in step 232, a determination is made as to whether the end of the primary list or the end of the secondary list is reached. If the determination in step 232 is negative, then the program returns to START to continue processing elements of the primary and secondary lists as just described hereinabove. However, if the determination in step 232 is affirmative, the program proceeds to step 234 in which a determination is made as to whether the percentage of matches found between the primary and secondary lists is above a predetermined percentage value. If the determination is step 234 is affirmative, the program proceeds directly to step 246 in TEST 2.3 shown in FIG. 4C. However, if the determination is step 234 is negative, the program proceeds to step 236 in TEST 2.2 shown in FIG. 4C before possibly proceeding to step 246 in TEST 2.3.

Figure 4C:
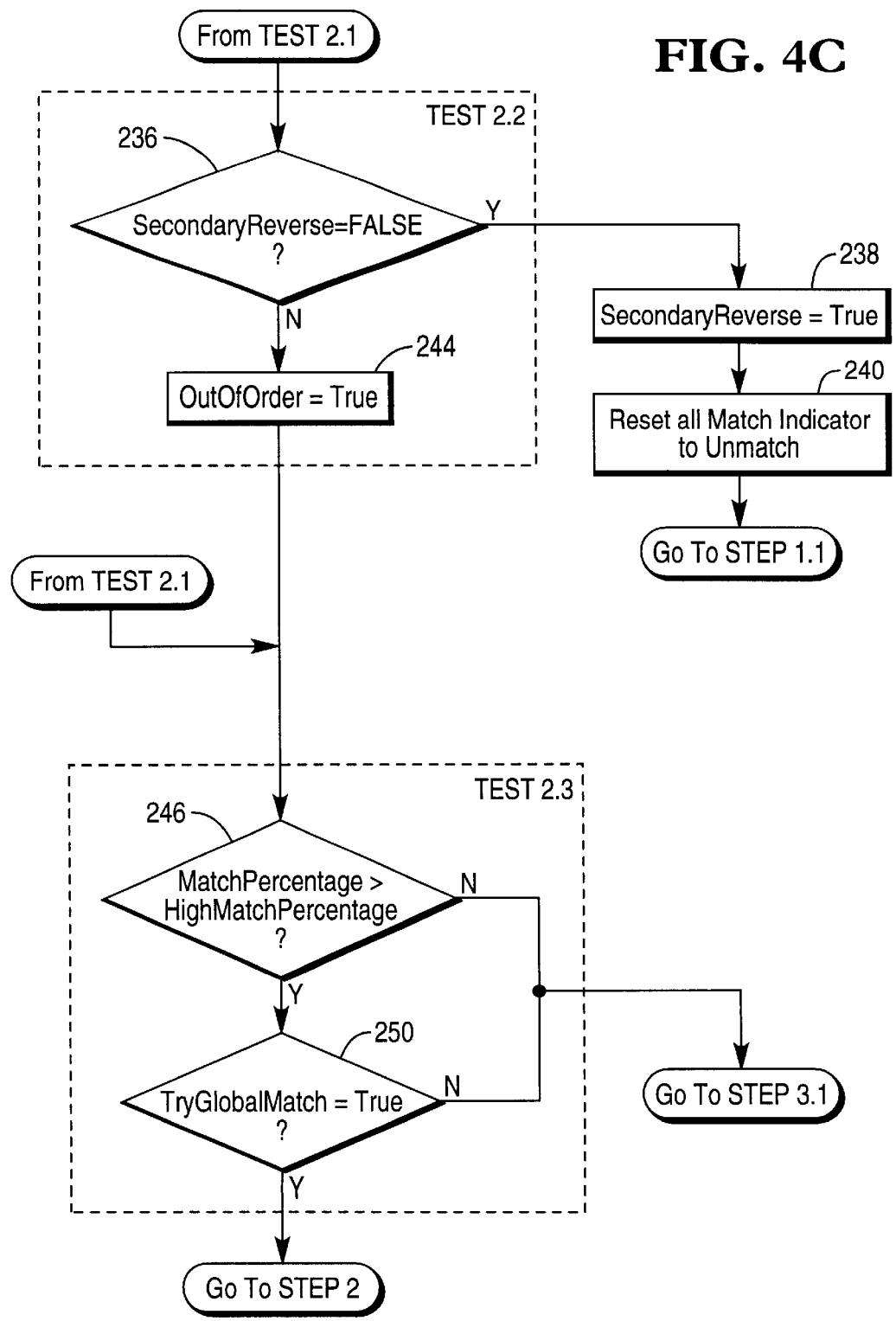
Figure 4D:
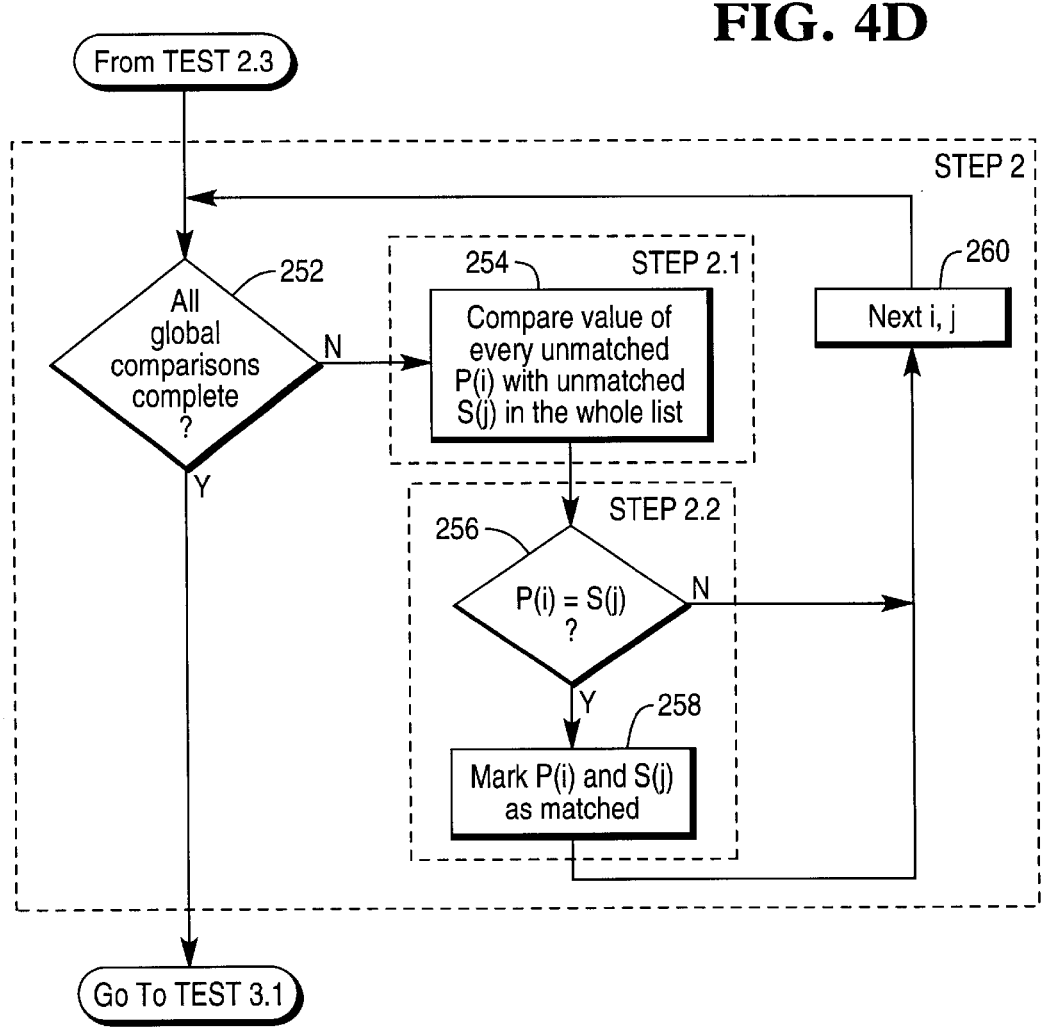
Figure 4E:
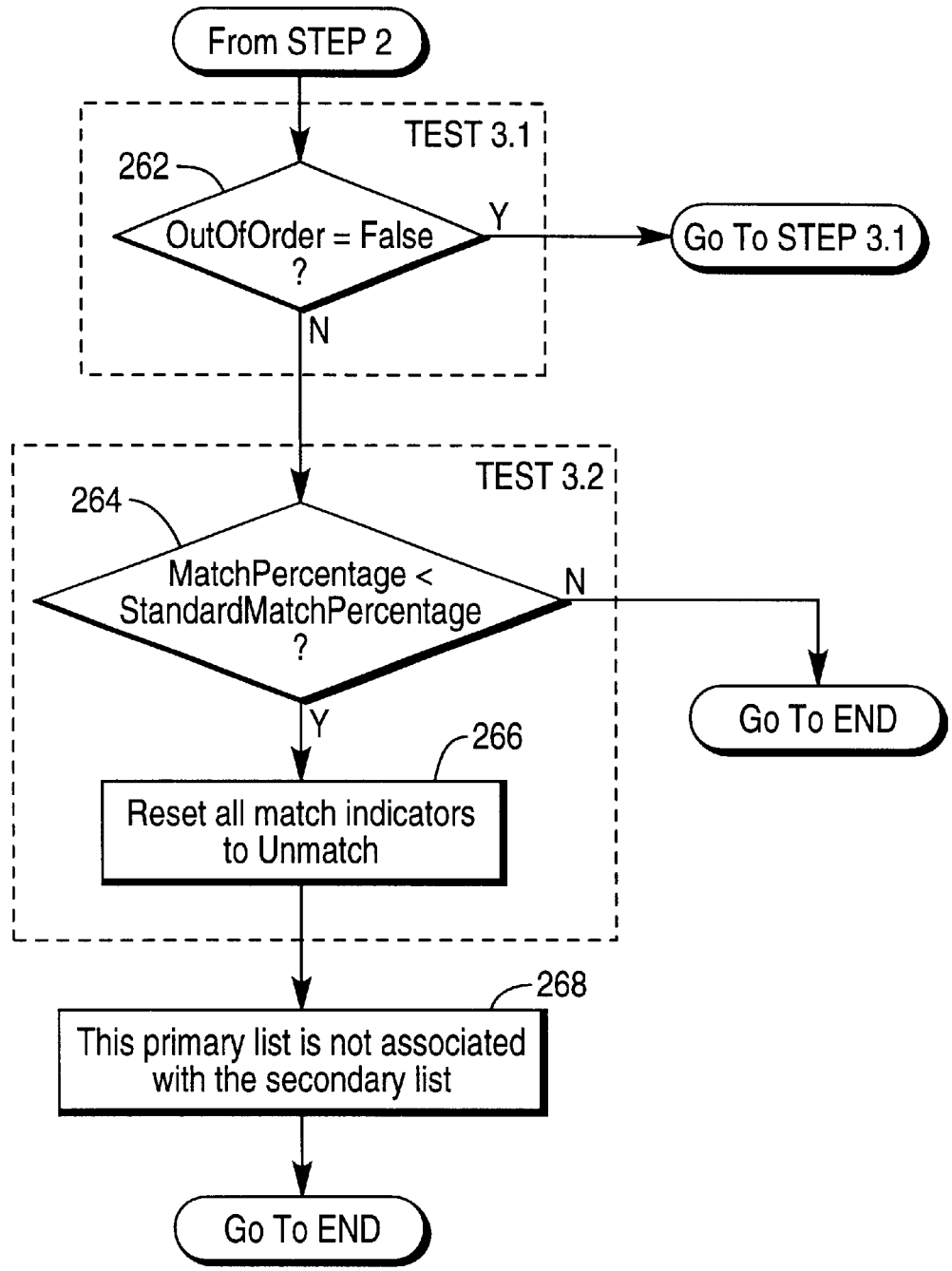
Figure 4F:
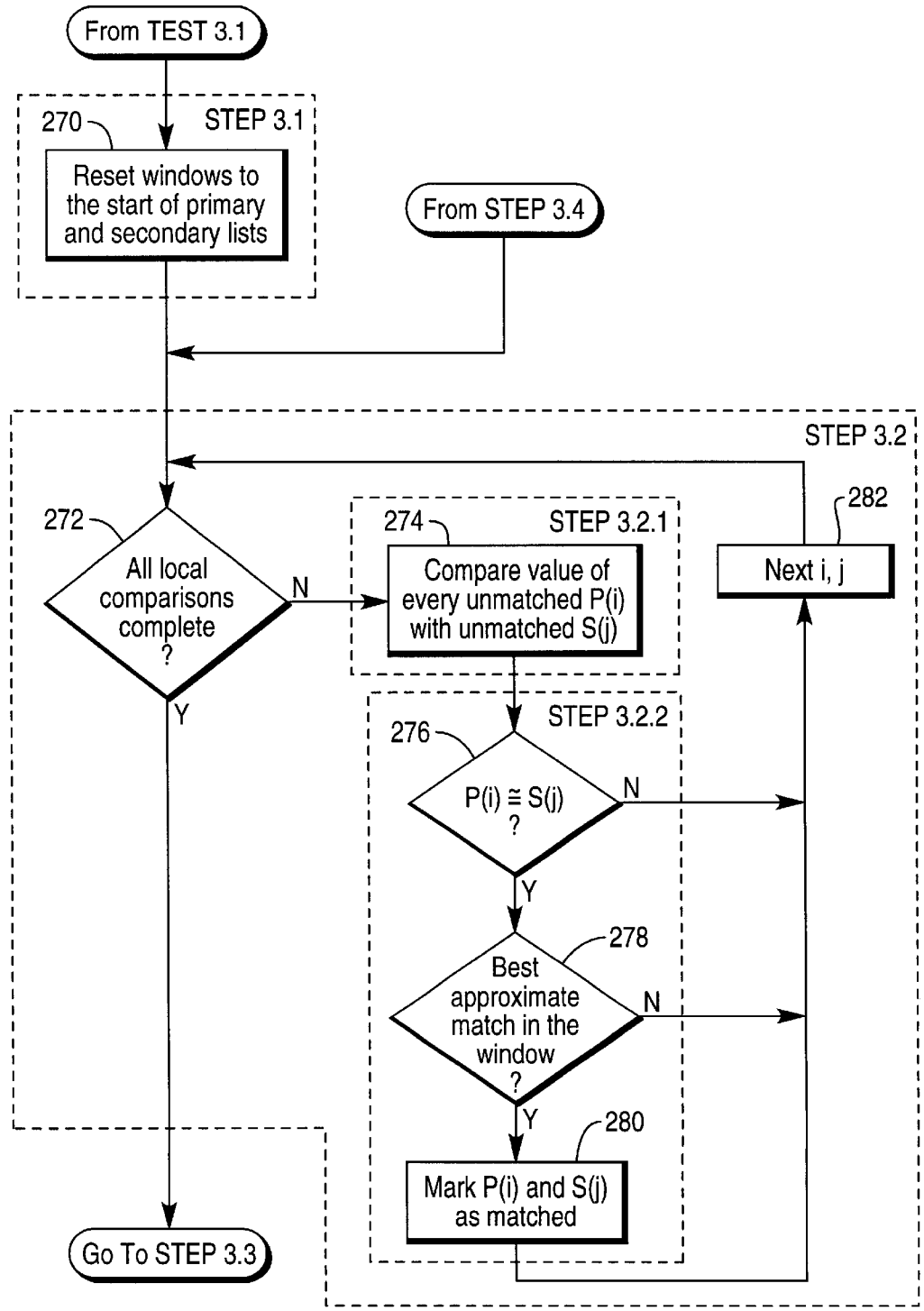

In step 236 in TEST 2.2 shown in FIG. 4C, a determination is made as to whether FLAG "A" is false. The determination in step 236 is identical to the determination made in step 234 described previously. If the determination made in step 236 is affirmative, the program proceeds to steps 238 and 240 to set FLAG "A" to "true" and to reset all match marks on all of the elements of the primary and secondary lists before returning to START in an attempt to perform an exact match in reverse order. However, if the determination made in step 236 is negative, the program proceeds to step 244 in which FLAG "B" is set to "true". The program proceeds from step 244 to step 246 in TEST 2.3 shown in FIG. 4C.

In step 246 in TEST 2.3 shown in FIG. 4C, a determination is made as to whether the percentage of matches found between the primary and secondary lists is above the predetermined percentage value. The determination in step 246 is identical to the determination made in step 234 described previously. If the determination made in step 246 is negative, the program proceeds directly to step 270 in FIG. 4F. If the determination in step 246 is affirmative, the program proceeds to step 250 in which a determination is made as to whether FLAG "C" is set to "true". If the determination is step 250 is negative, the program proceeds directly to step 270 in FIG. 4F. If the determination in step 250 is affirmative, the program proceeds to step 252 in STEP 2 shown in FIG. 4D.

In step 252, a determination is made as to whether all global elements of the primary list and all global elements of the secondary list have been made. If the determination in step 252 is negative, the program proceeds to steps 254 and 256 in which the value of an unmatched element in the primary list is compared with the value of an unmatched element in the secondary list. If the determination is step 256 is negative, then the program loops back to step 252 through step 260 in which the next unmatched element in the primary list and the next unmatched element in the secondary list are compared. If the determination in step 256 is affirmative, the program proceeds to step 258 in which the unmatched element in the primary list and the unmatched element in the secondary list are both marked as being matched to each other.

However, if the determination in step 252 is affirmative, then the program proceeds to step 262 in which a determination is made as to whether FLAG "B" is set to "false". If the determination in step 262 is affirmative, the program proceeds directly to step 270 in FIG. 4F. However, if the determination in step 262 is negative, the program proceeds to step 264 in which a determination is made as to whether the percentage of matches found between the primary and secondary lists is below the predetermined percentage value. If the determination made in step 264 is negative, the program proceeds directly to END in which a conclusion is made that the primary and secondary lists match. However, if the determination in step 264 is affirmative, the program proceeds to step 266 in which all match marks on the elements in the primary and secondary lists are reset. A conclusion is then made that the primary list presently under consideration is not associated with the secondary list presently under consideration, as shown in step 268. The program then proceeds to END.

When the program is at step 270, the window 51 on the primary list 50 and the window 53 on the secondary list 52 are moved back to the beginning of the respective list. The program proceeds to step 272 in which a determination is made as to whether all local comparisons of elements in the primary list and elements in the secondary list have been made. If the determination in step is affirmative, the program proceeds directly to step 284 in STEP 3.3 shown in FIG. 4G. If the determination in step 272 is negative, the program proceeds to step 274 in which the value of every unmatched element in the primary list is compared with the value of every unmatched element in the secondary list.

A determination is made in step 276 as to whether any approximate match is found based upon the comparisons of step 274. If no match is found as determined in step 276, the program loops back to step 272 through step 282 in which the next elements in the primary and secondary lists 50,52 are selected for comparison in step 272. However, if an approximate match is found as determined in step 276, the program proceeds to step 278 in which a determination is made as to whether the match just found is the best approximate match considering all of the elements contained in the windows on the primary and secondary lists 50,52. If the determination in step 278 is negative, then program proceeds to step 282 in which the next elements in the primary and secondary lists are selected for comparison in step 272. However, if the determination in step 278 is affirmative, the program proceeds to step 280 in which the element in the primary list and the element in the secondary list are marked as being matched to each other.

There are a number of different ways to determine if an approximate match has occurred in step 276 just described hereinabove. One way is to use a character confusion reliability table as shown in FIG. 5 to determine if a Match Reliability Value is greater than a Predetermined Match Reliability Value. The Predetermined Match Reliability Value is set equal to 0.85, for example. The Match Reliability Value is equal to the summation of a character confusion reliability value for each character divided by the quantity of the length of the amount plus one times 10, i.e., Match Reliability Value=Σ (character confusion reliability value for each character)/(length of amount+1)*10.

If the Match Reliability Value is greater than the Predetermined Match Reliability Value, then the primary element and secondary element are considered approximately matched. Otherwise, the primary element and the secondary element are considered to be not approximately matched. Two examples are shown below.

EXAMPLE 1

Primary amount=$5.27;

Secondary amount=$5.21;

Match Reliability Value=(10+10+7)/(3+1)*10=0.9;

Match Reliability Value>Predetermined Match Reliability Value;

Therefore, $5.27 and $5.21 are considered approximately matched.

EXAMPLE 2

Primary amount=$123.00;

Secondary amount=$527.65;

Match Reliability Value=(1+10+3+7+3)/(5+1)*10=0.4;

Match Reliability Value<Predetermined Match Reliability Value;

Therefore, $123.00 and $527.65 are considered not approximately matched.

When the program is at step 284 in STEP 3.3 shown in FIG. 4G, the window 51 over the primary list 50 is advanced such that the first element within the window 51 follows the last matched element in the previous window on the primary list 50. Also, as shown in step 286, the window 53 over the secondary list 52 is also advanced such that the first element within the window 53 follows the last matched element in the previous window on the secondary list 52 before proceeding to step 288. A determination is made in step 288 as to whether the end of the primary list or the end of the secondary list is reached. If the determination in step 288 is negative, the program returns to step 272 in STEP 3.2 shown in FIG. 4F. If the determination in step 288 is affirmative, the program proceeds to step 290.

In step 290, a determination is made as to whether FLAG "D" is set to "true". If the determination in step 290 is negative, the program proceeds to END and a conclusion is made that the primary and secondary lists match. If the determination in step 290 is affirmative, the program proceeds to step 292 in which elements from the primary list 50 and elements from the secondary list 52 which are approximately matched, as determined in step 278 and marked in step 280, are compared with each other in order to optimize the overall matching.

One way of comparing elements to determine if an approximate match has occurred in step 292 is to first take all approximately matched elements from both the primary and secondary lists 50,52 and then to sort these elements in ascending amounts. After the elements have been sorted in ascending order, adjacent elements in the sorted list are compared to determine if they are the same. For each pair of adjacent elements found to be the same, a determination is then made as to whether one element originally came from the primary list 50 and the other element originally came from the secondary list 52. If so, then this pair of adjacent elements is considered to be a match. Another way of comparing elements to determine if an approximate match has occurred in step 292 is to compare elements in the same as the way described hereinabove with reference to step 276.

A number of advantages result by providing improved assistance to an operator during operation of the image-based check processing system in accordance with the present invention. One advantage is that the chances for correct matches between the primary and secondary lists 50,52 are increased and chances for mismatches between the primary and secondary lists are decreased. Another advantage is that by using specific local value matching techniques as described hereinabove, calculations used in determining whether an element of the primary list 50 and an element of the secondary list 52 match or not are kept efficient, especially when the primary and secondary lists are relatively long. Still another advantage is that the use of specific tests and control parameters in the specific tests in certain steps of the program described hereinabove provides flexibility in how the program is applied.

From the above description of the invention, those skilled in the art to which the present invention relates will perceive improvements, changes and modifications. Numerous substitutions and modifications can be undertaken without departing from the true spirit and scope of the invention. Such improvements, changes and modifications within the skill of the art to which the present invention relates are intended to be covered by the appended claims.

What is claimed is:

1. A method of processing documents in an image-based document processing system to associate recognition results from a primary source results list with corresponding recognition results from a secondary source results list to improve assistance to an operator of the image-based document processing system during operation of the image-based document processing system, the method comprising the steps of:

(a) scanning a first type of document to obtain scanned data representative thereof;

(b) scanning a second type of document to obtain scanned data representative thereof;

(c) processing scanned data representative of the first type of document to provide recognition results associated with the first type of document;

(d) processing scanned data representative of the second type of document to provide recognition results associated with the second document;

(e) storing recognition results associated with the first type of document in a primary list, wherein the recognition results associated with the first type of document comprise a first set of global elements;

(f) storing recognition results associated with the second type of document in a secondary list, wherein the recognition results associated with the second type of document comprise a second set of global elements;

(g) placing a first window of a first predetermined size over the first set of global elements from the primary list to define a first set of local elements which is a subset of the first set of global elements;

(h) placing a second window of a second predetermined size over the second set of global elements from the secondary list to define a second set of local elements which is a subset of the second set of global elements;

(i) comparing an element of the first set of global elements from the primary list with an element of the second set of global elements from the secondary list to determine if there is an exact global match therebetween; and (j) comparing an element of the first set of local elements from the primary list with an element of the second set of local elements from the secondary list to determine if there is an approximate local match therebetween when an exact global match fails to occur in step (i).

2. A method according to claim 1, wherein step (j) includes the step of:

(j-1) calculating a value based upon an element of the first set of local elements from the primary list and an element of the second set of local elements from the secondary list; and (j-2) comparing the value calculated in step (j-1) with a predetermined value to allow a determination to be made as to whether there is an approximate local match between an element of the first set of local elements from the primary list and an element of the second set of local elements from the secondary list.

3. A method according to claim 2, further comprising the step of:

(k) determining that there is an approximate local match between an element of the first set of local elements from the primary list and an element of the second set of local elements from the secondary list when the calculated value is greater than the predetermined value.

4. A method according to claim 2, further comprising the step of:

(k) determining that there is an approximate local match between an element of the first set of local elements from the primary list and an element of the second set of local elements from the secondary list when the calculated value is less than the predetermined value.

5. A method according to claim 1, wherein the first predetermined size of the first window and the second predetermined size of the second window are the same.

6. A method of processing documents in an image-based document processing system to associate recognition results from a primary source results list with corresponding recognition results from a secondary source results list to improve assistance to an operator of the image-based document processing system during operation of the image-based document processing system, the method comprising the steps of:

(a) scanning a first type of document to obtain scanned data representative thereof;

(b) scanning a second type of document to obtain scanned data representative thereof;

(c) processing scanned data representative of the first type of document to provide recognition results associated with the first type of document;

(d) processing scanned data representative of the second type of document to provide recognition results associated with the second document;

(e) storing recognition results associated with the first type of document in a primary list, wherein the recognition results associated with the first type of document comprise a first set of global elements;

(f) storing recognition results associated with the second type of document in a secondary list, wherein the recognition results associated with the second type of document comprise a second set of global elements;

(g) placing a first window of a first predetermined size over the first set of global elements from the primary list to define a first set of local elements which is a subset of the first set of global elements;

(h) placing a second window of a second predetermined size over the second set of global elements from the secondary list to define a second set of local elements which is a subset of the second set of global elements;

(i) comparing an element of the first set of local elements from the primary list with an element of the second set of local elements from the secondary list to determine if there is an exact local match therebetween; and (j) comparing an element of the first set of local elements from the primary list with an element of the second set of local elements from the secondary list to determine if there is an approximate local match therebetween when an exact local match fails to occur in step (i).

7. A method according to claim 6, wherein step (j) includes the step of:

(j-1) calculating a value based upon an element of the first set of local elements from the primary list and an element of the second set of local elements from the secondary list; and (j-2) comparing the value calculated in step (j-1) with a predetermined value to allow a determination to be made as to whether there is an approximate local match between an element of the first set of local elements from the primary list and an element of the second set of local elements from the secondary list.

8. A method according to claim 7, further comprising the step of:

(k) determining that there is an approximate local match between an element of the first set of local elements from the primary list and an element of the second set of local elements from the secondary list when the calculated value is greater than the predetermined value.

9. A method according to claim 7, further comprising the step of:
(k) determining that there is an approximate local match between an element of the first set of local elements from the primary list and an element of the second set of local elements from the secondary list when the calculated value is less than the predetermined value.

10. A method according to claim 6, wherein the first predetermined size of the first window and the second predetermined size of the second window are the same.

11. An apparatus for processing documents in an image-based document processing system to associate recognition results from a primary source results list with corresponding recognition results from a secondary source results list to improve assistance to an operator of the image-based document processing system during operation of the image-based document processing system, the apparatus comprising:
means for scanning first and second types of document to obtain scanned data representative thereof;
means for processing scanned data representative of the first and second types of document to provide recognition results associated therewith;
means for storing recognition results associated with the first type of document in a primary list, wherein the recognition results associated with the first type of document comprise a first set of global;
means for storing recognition results associated with the second type of document in a secondary list, wherein the recognition results associated with the second type of document comprise a second set of global elements;
means for placing a first window of a first predetermined size over the first set of global elements from the primary list to define a first set of local elements which is a subset of the first set of global elements;
means for placing a second window of a second predetermined size over the second set of global elements from the secondary list to define a second set of local elements which is a subset of the second set of global elements; and
means for (i) comparing an element of the first set of global elements from the primary list with an element of the second set of global elements from the secondary list to determine if there is an exact global match therebetween, and (ii) comparing an element of the first set of local elements from the primary list with an element of the second set of local elements from the secondary list to determine if there is an approximate local match therebetween when an exact global match fails to occur.

12. An apparatus according to claim 11, further comprising:
means for calculating a value based upon an element of the first set of local elements from the primary list and an element of the second set of local elements from the secondary list; and
means for comparing the calculated value with a predetermined value to allow a determination to be made as to whether there is an approximate local match between an element of the first set of local elements from the primary list and an element of the second set of local elements from the secondary list.

13. An apparatus according to claim 12, further comprising:
means for determining that there is an approximate local match between an element of the first set of local elements from the primary list and an element of the second set of local elements from the secondary list when the calculated value is greater than the predetermined value.

14. An apparatus according to claim 12, further comprising:
means for determining that there is an approximate local match between an element of the first set of local elements from the primary list and an element of the second set of local elements from the secondary list when the calculated value is less than the predetermined value.

15. A method according to claim 11, wherein the first predetermined size of the first window and the second predetermined size of the second window are the same.

16. An apparatus for processing documents in an image-based document processing system to associate recognition results from a primary source results list with corresponding recognition results from a secondary source results list to improve assistance to an operator of the image-based document processing system during operation of the image-based document processing system, the apparatus comprising:
means for scanning first and second types of document to obtain scanned data representative thereof;
means for processing scanned data representative of the first and second types of document to provide recognition results associated therewith;
means for storing recognition results associated with the first type of document in a primary list, wherein the recognition results associated with the first type of document comprise a first set of global elements;
means for storing recognition results associated with the second type of document in a secondary list, wherein the recognition results associated with the second type of document comprise a second set of global elements;
means for placing a first window of a first predetermined size over the first set of global elements from the primary list to define a first set of local elements which is a subset of the first set of global elements;
means for placing a second window of a second predetermined size over the second set of global elements from the secondary list to define a second set of local elements which is a subset of the second set of global elements; and
means for (i) comparing an element of the first set of local elements from the primary list with an element of the second set of local elements from the secondary list to determine if there is an exact local match therebetween, and (ii) comparing an element of the first set of local elements from the primary list with an element of the second set of local elements from the secondary list to determine if there is an approximate local match therebetween when an exact local match fails to occur.

17. An apparatus according to claim 16, further comprising:
means for calculating a value based upon an element of the first set of local elements from the primary list and an element of the second set of local elements from the secondary list; and
means for comparing the calculated value with a predetermined value to allow a determination to be made as to whether there is an approximate local match between an element of the first set of local elements from the primary list and an element of the second set of local elements from the secondary list.

18. An apparatus according to claim 17, further comprising:

means for determining that there is an approximate local match between an element of the first set of local elements from the primary list and an element of the second set of local elements from the secondary list when the calculated value is greater than the predetermined value.

19. An apparatus according to claim 17, further comprising:

means for determining that there is an approximate local match between an element of the first set of local elements from the primary list and an element of the second set of local elements from the secondary list when the calculated value is less than the predetermined value.

20. A method according to claim 16, wherein the first predetermined size of the first window and the second predetermined size of the second window are the same.

* * * * *